United States Patent [19]
Villaume et al.

[11] 3,916,936
[45] Nov. 4, 1975

[54] REDUNDANT AUTOMATIC MOISTURE DUMP SYSTEM

[75] Inventors: Henry F. Villaume, Intervale, N.H.; Stephen D. Collins, Bridgton, Maine; Robert Gary Brauns, Glen, N.H.

[73] Assignee: Howell Laboratories, Incorporated, Bridgton, Maine

[22] Filed: May 20, 1974

[21] Appl. No.: 471,284

[52] U.S. Cl.................................. 137/204; 137/195
[51] Int. Cl.² ........................................... F16T 1/00
[58] Field of Search ............ 137/204, 203, 192, 195, 137/1, 2, 187; 55/166, 167, 219

[56] References Cited
UNITED STATES PATENTS

| 1,463,990 | 8/1923 | Wilson | 55/219 |
| 3,318,074 | 5/1967 | Keller | 55/219 X |
| 3,358,790 | 12/1967 | Krudewig | 55/219 X |

FOREIGN PATENTS OR APPLICATIONS

| 405,779 | 11/1924 | Germany | 137/187 |
| 425,741 | 2/1926 | Germany | 137/184 |

*Primary Examiner*—Alan Cohan
*Attorney, Agent, or Firm*—Richard L. Stevens

[57] ABSTRACT

A redundant automatic moisture dump system for use with compressed air systems. A housing, including a sump, is secured to a separator, and moisture and particulate matter removed from the separator accumulates in the sump. For normal operation, a first valve assembly periodically discharges the accumulated liquid and particulate matter accumulated in the sump. Upon failure of the first valve assembly to function properly, the liquid level in the sump will rise. When the liquid level reaches a second predetermined level, a sensor actuates an alarm system and a second valve assembly, which second valve assembly is in communication with the sump. The second valve assembly discharges the accumulated liquid and particulate matter from the sump, and the alarm provides an indication that the first valve assembly is malfunctioning.

7 Claims, 3 Drawing Figures

REDUNDANT AUTOMATIC MOISTURE DUMP SYSTEM

BACKGROUND OF THE INVENTION

Dump valves used with compressed air systems assume many configurations and may be categorized in two basic groups, manual and automatic. Manual valves are available which require an operator to open them periodically to remove the accumulated liquid. Automatic valves are actuated by the accumulation of a liquid level or a timer. If the automatic valve clogs prior to a manual check, then the compressed air flowing in the system carries the condensed moisture through to contaminate the instrumentation and equipment downstream of the dump valve. The automatic valves may discharge depending upon a pressure differential to unseat a piston, or the level of liquid in a sump rises to a perdetermined level at which time it will actuate a valve to discharge accumulated liquid. Automatic dump valves, even those which include a manual override, are not fail-proof. When failure occurs, the instruments and equipment downstream which require the clean air become contaminated subsequent to valve failure. Even with a warning system and a manual override, in almost all cases, corrective action is not taken in sufficient time because there is no warning prior to malfunction. This results in considerable production down time in order to clean instrumentation and equipment.

A primary cause for failure for dump valves is oil and particulate matter in the air stream to be cleaned by a separator, which particulate matter accumulates in the discharge orifices and other working parts of the automatic dump valves, causing their malfunction. Thus, when the liquid level commences to rise, either the discharge ports are clogged such that the liquid cannot be discharged or the parts which allow the discharge port to open do not function properly.

Therefore, there exists a need for a reliable dump valve which will without manual correction recognize a malfunction and automatically discharge accumulated liquid as required. Further, this automatic back-up feature should provide a warning whereby the primary malfunction could be corrected. This should all be accomplished without interfering with the flow of clean air to the instruments and equipment.

SUMMARY OF THE INVENTION

Our invention relates to a redundant automatic moisture dump system, an alarm or redundant operation, and a metod of operating the same. In one embodiment, the system includes primary and secondary valve liquid discharge assemblies, the secondary assembly adapted to function only upon the malfunction of the primary valve assembly, and an alarm indicating such operation.

In a preferred embodiment of the invention, the primary valve assembly is responsive to the rise of liquid level in a reservoir or sump. When the liquid has reached a predetermined level, the valve is actuated, and liquid discharged. If the first valve assembly fails, the liquid level will continue to rise. A sensor, isolated from the flow of fluid through the system such that the cause of the malfunction of the first assembly, e.g. particulate matter, will not affect the sensor, actuates the second valve assembly. Actuation of the second valve assembly places the second valve assembly on line, whereby the accumulated fluid in the sump is discharged. The second assembly will continue to function until the malfunction of the first assembly is corrected. An alarm light and contacts for remote indication of first valve failure provide timely warning of the need for maintenance cleaning of the first valve. Thus, continuous operation is assured, and no contaminant is allowed to flow downstream of the separator with which the valve dump system is in communication.

The system of the preferred embodiment includes a housing having a sump, the housing in communication with a separator to remove particulate matter, including moisture, from the air flowing therethrough. The removed moisture accumulates in the sump. When the liquid in the sump reaches a predetermined level, a valve discharges the liquid. A sensor isolated from the liquid in the sump monitors the liquid level. A second valve assembly will discharge the liquid from the sump when the sensor is actuated. The sensor will actuate the second valve assembly only when the first valve assembly fails to function. An alarm indicates that maintenance is required for the first valve.

The method of our invention includes discharging liquid from a sump of an automatic moisture dump system when the liquid reaches a first level, sensing the rise in liquid level in the sump after the primary valve assembly has failed, discharging the liquid from the sump when the sensor recognizes a second liquid level, and activating an alarm.

DESCRIPTION OF THE PREFERRED EMBODIMENT(S)

Figures 1, 2:
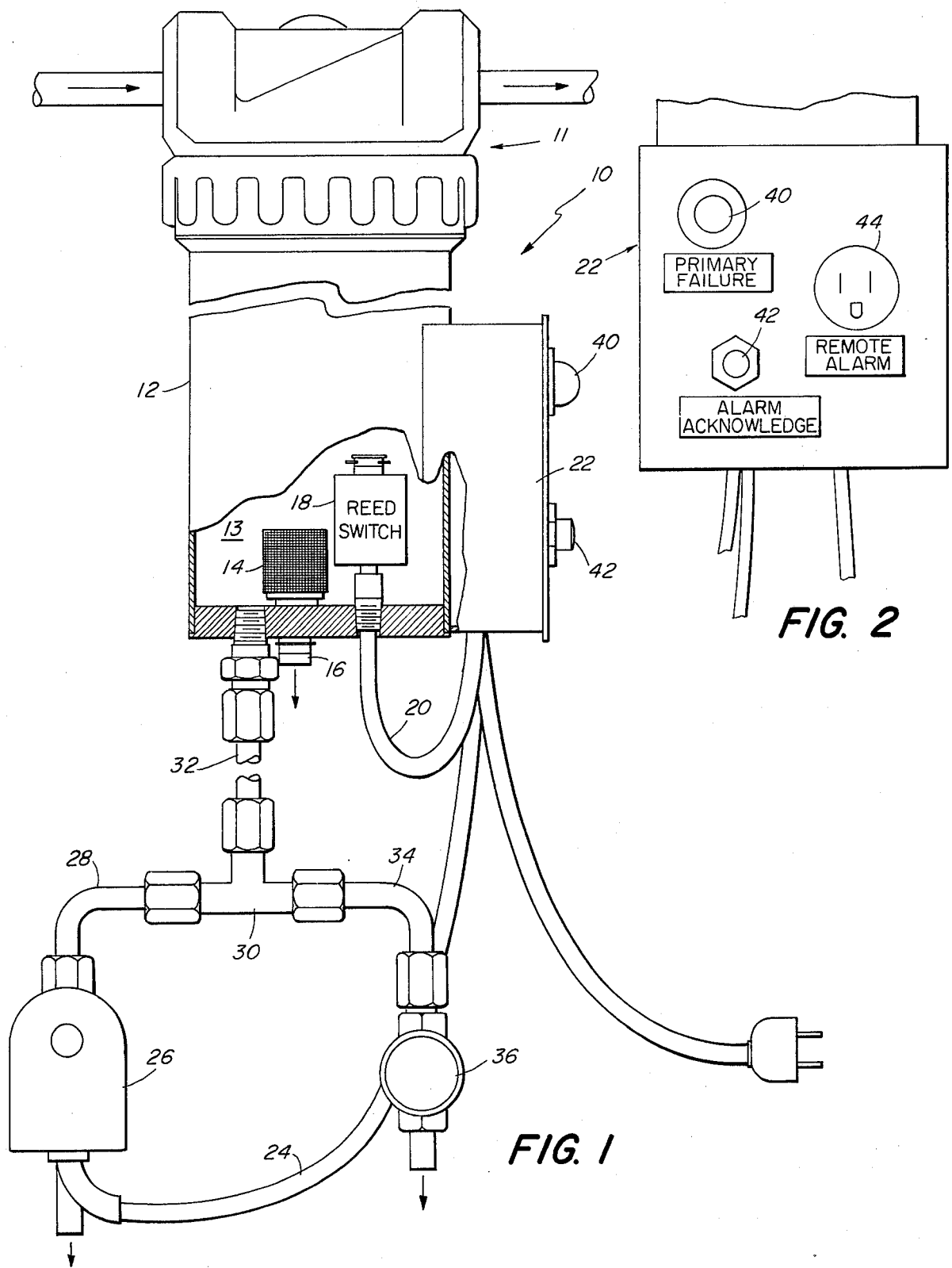
FIG. 1 is a partially fragmentary front view of a redundant dual mode dump system embodying the invention.
FIG. 2 is a front view of alarm indicators.

A redundant automatic moisture dump system 10 embodying one aspect of the invention is shown in FIG. 1. The system 10 engages a conventional separator 11, such as a Watts separator No. 603-6. Air from the customer supply line is introduced to the separator 11 where the particulate matter and moisture is removed.

The air may be any fluid stream from any fluid source. In the preferred embodiment, air entering the separator may contain from 5 to 10% moisture and particulate matter such as piping system corrosion, dust, sand, compressor oil, etc. The air leaving the separator 12 would have a moisture content of from 0.1 to 0.05%. The clean air discharged flows to instrumentation and equipment (not shown) such as air gaging equipment, pneumatic control valves, fluidic elements, etc.

A cylindrical housing 12 is threaded to the separator 11. Threaded into the bottom of the housing is a primary valve assembly 14 which comprises a mechanical dump valve, such as a Parker Hannefin No. PL5725, including a discharge conduit 16. A secondary valve assembly 18 comprises a sealed reed switch and float with permanent magnets, such as a Gems Model LS-1800, P/N 01801 (Brass), threaded to the bottom of the housing 12 and a solenoid valve 26. A wire 24, from the box 22, communicates with the solenoid valve 26, such as a Sporlan Type W3P1. A conduit 28 is threaded to the solenoid valve 26 and to a T-coupling 30. The coupling 30 is threaded to one end of a discharge outlet 32, and the other end of the outlet 32 is received in the housing 12. The other side of the coupling 30 is threaded to a conduit 34, which in turn is threaded to a manual valve 36.

Figure 3:
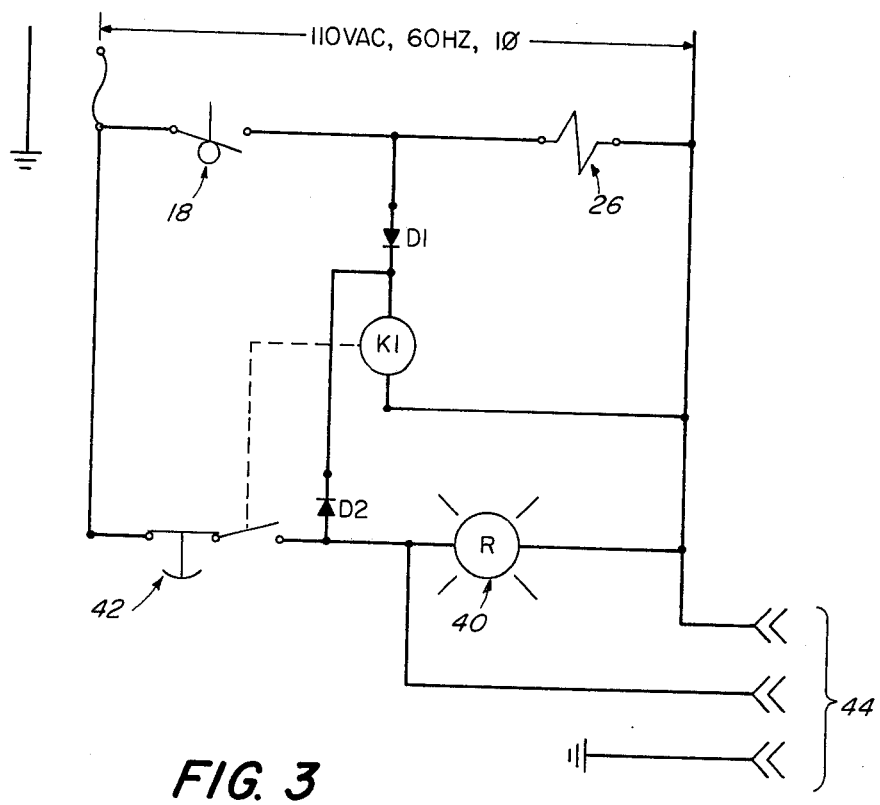
FIG. 3 is a schematic of the circuit used in the preferred embodiment.

Referring to FIGS. 2 and 3, a control circuit for the operation of the invention includes the solenoid valve 26, an alarm acknowledge and reset push button switch 42, an alarm light 40, a remote alarm outlet 44, and the reed switch 18, all of which are shown schematically. The circuit also includes diodes D1 and D2; and a relay coil K-1.

In the operation of our invention, air to be cleaned passes through the separator 11. Moisture and particulate matter is removed and falls to the bottom of the housing 12, which functions as a sump 13. As the liquid continues to rise and reaches a first level, as determined by the dump valve 14, the dump valve 14 will actuate and discharge the accumulated liquid through the conduit 16. When the mechanical dump valve 14 fails, the liquid level will continue to rise. A float (not shown) around the reed switch assembly 18 will rise, actuating the reed switch. It should be noted that if particulate matter is the cause for the failure of the dump valve, that the float of the reed switch assembly is much less sensitive to the same contamination. Firstly, the dimensions of the path within which the float of the reed switch rises and falls are quite large in comparison to the conduits of the dump valve; and secondly, as long as the valve 14 functions, the water and particulate matter accumulating in the bowl continue to settle out and do not contact the sealed reed switch assembly 18.

When the reed switch assembly 18 is actuated, a signal is transmitted to the box 22, the alarm light 40 is illuminated, the contacts of the remote alarm outlet 44 are closed and the solenoid valve 26 is opened, discharging the accumulated liquid in the housing 12 through the conduits 32 and 28.

More specifically, and referring to FIG. 3, when the reed switch 18 closes, the solenoid valve 26 and the relay coil K-1 are energized. Energizing the solenoid valve 26 opens the valve and results in the discharge of the accumulated material in the sump 13. As the material is discharged, the float on the reed switch descends to a lower level, whereby the reed switch 18 is again opened. Energizing the relay coil K-1 results in the closure of a normally open switch SW1. This provides a parallel path to maintain the flow of current for the alarm light 40 and the remote alarm outlet 44. Switch SW1 will remain closed regardless of the opening and closing of the reed switch 18. The diodes D1 and D2 prevent energizing the solenoid valve 26 when the alarm condition exists and the reed switch 18 is open. To terminate the alarm condition, the momentary push button 42 is actuated, breaking the circuit, deenergizing the relay coil K-1, and allowing the switch SW1 to return to its normally open position. The switch SW1 will remain in the open position until such time that the reed switch 18 is closed. Thus, once the reed switch 18 has been activated the alarm condition will continue to display despite the energizing and deenergizing of the solenoid valve 26 or the possible intermittent operation of the first valve 14. By resetting the alarm with push-button 42 an operator may determine whether the failure is of an intermittent or permanent nature. Also, it should be noted that the result of the failure of the valve 14, the continuous rise of the liquid level, is the cause of the actuation of the reed switch 18. The alarm outlet 44 is provided in the event that remote audio or visual alarm is desired. Also, the manual override valve 36 may be used as desired to permit egress of the condensed moisture in the bottom of the sump.

Although described in reference to a specific separator, any structure may be employed with our invention which will remove particulate matter and moisture from a fluid stream as desired.

The alarm system provides an indication that the system is operating on the second or back-up valve assembly. However, if no corrective action is taken, even the second valve assembly will eventually fail. Normally, the second valve assembly, except in extreme cases, would function adequately for months until a failure of the secondary system would occur. If desired, a third sensor may be placed at a third level distinct from the first and second levels, to either operate a third valve assembly or to provide a further alarm that the secondary system has failed. However, the primary purpose of the secondary valve assembly as described in the preferred embodiment is to insure that no moisture and particulate matter will flow downstream of the separator and to allow sufficient time to remedy the failure of the first valve assembly.

In the description of the preferred embodiment, two valve assemblies operating on different principles have been employed for the primary and secondary valve assemblies for the dual mode operation of the system. If desired, a second mechanical dump valve may be used instead of the reed switch assembly. Also, the primary valve assembly may include any valve arrangement, mechanical, electrical, etc. However, it is advantageous that the second valve assembly function on a different principle than that of the primary assembly, such that that which causes the malfunction of the first assembly will not also cause a malfunction of the second assembly. It is also preferable to use an electrically operated second valve assembly as the actuation of this also provides the alarm signal with a minimum number of components.

The employment of a solenoid valve is advantageous in that the reed switch or electrical sensor serves both to open the solenoid valve and to actuate the alarm. If desired, a fluidic liquid level sensor, thermistor combinations for liquid level sensor, and other techniques, may all be used to actuate the alarm. Alternatively, a pressure sensor in the drain line of the second valve would also function within the scope of the invention.

Having described our invention, what we now claim is:

1. A redundant automatic moisture dump system which comprises:
   a. a housing which includes a sump;
   b. a first valve assembly secured to the housing and disposed in the sump and adapted to discharge from the sump accumulated liquid when the liquid reaches a first level;
   c. a second valve assembly which includes a sensor secured to the housing and spaced apart from the first valve assembly, the sensor adapted to provide a signal when the liquid in the sump reaches a second level which is higher than the first level and which second level is caused by failure of the first valve assembly to discharge the liquid material when the liquid material reaches the first level; and a second valve external of the housing and secured to the bottom of the sump at a third level lower than the first level such that upon receipt of the signal from the sensor when the liquid has reached the second level, the liquid accumulated in the sump is discharged from the third level.

2. The system of claim 1, wherein the means to sense the liquid at the second level is a reed switch and the second valve is a solenoid valve in communication with the reed switch.

3. The system of claim 1, wherein the first valve assembly is a mechanical dump valve.

4. The system of claim 1, which includes means to separate from a fluid stream particulate matter, including moisture, said means secured to the housing such that the moisture and particulate matter are accumulated in the sump.

5. The system of claim 1, which includes an alarm adapted to receive signals from the sensor such that when the liquid level reaches the second level, said alarm is activated.

6. The system of claim 5 which includes means to actuate continuously the alarm subsequent to the discontinuance of the signal from the sensor.

7. The system of claim 6 which includes means to terminate the alarm.

* * * * *